United States Patent [19]
Coscia

[11] 3,767,096
[45] Oct. 23, 1973

[54] APPARATUS FOR DEFLASHING MOLDED ARTICLES

[75] Inventor: Giovanni A. Coscia, Milnate, Italy

[73] Assignee: Societe Generale Conseil So. Ge. Co., Zurich, Switzerland

[22] Filed: Nov. 10, 1971

[21] Appl. No.: 197,353

[30] Foreign Application Priority Data
Nov. 12, 1970 Italy .............................. 31626 A/70

[52] U.S. Cl. .................... 225/97, 51/164, 225/93, 225/93.5, 425/806
[51] Int. Cl. ............................................. B26f 3/00
[58] Field of Search ...................... 264/161; 51/163, 51/164, 322; 241/190, 191, 66, 65, 23, 26, 172, 174; 15/3, 16, 21 D, 21 R, 21 A, 398; 425/806; 225/97, 93.5, 93

[56] References Cited
UNITED STATES PATENTS

| | | |
|---|---|---|
| 2,682,732 | 7/1954 | Hanrahan et al. .................... 51/164 |
| 3,333,367 | 8/1967 | Salvaire ............................... 51/164 |
| 2,342,443 | 2/1944 | Wood .................... 425/806 |
| 2,380,653 | 7/1945 | Kopplin .......................... 241/26 UX |
| 2,476,540 | 7/1949 | Fraser ............................ 241/26 UX |
| 2,881,571 | 4/1959 | Granata ................................ 51/164 |
| 3,134,413 | 5/1964 | Dorsa et al. ....................... 51/163 X |
| 3,528,201 | 9/1970 | Jones et al. ............................ 51/164 |
| 3,640,029 | 2/1972 | Zildjian ................................. 51/322 |
| 3,664,592 | 5/1972 | Schweigert et al. ............ 241/190 X |

Primary Examiner—Frank T. Yost
Attorney—Finnegan, Henderson, Farabow & Garrett

[57] ABSTRACT

An improved deflashing apparatus comprises a container for the articles to be deflashed, a cooling system for said articles, and an agitating device within said container for imparting a movement to said articles with a direct mechanical action thereon and consequent removal of the flash which has become brittle owing to the cooling. In the most preferred embodiment the agitating device comprises a pair of rotating brushes and the inside of the container has an essentially bi-lobed shape.

3 Claims, 2 Drawing Figures

APPARATUS FOR DEFLASHING MOLDED ARTICLES

BACKGROUND OF THE INVENTION

This invention relates to an apparatus for deflashing rubber and like articles, more particularly molded articles.

It is known that in the molded rubber and like articles it is necessary for the flash to be removed in order to obtain articles free from any imperfections. A number of apparatus useful for this purposes are already known. The known apparatus are essentially of two types: namely rotating drum apparatus and vibrating container apparatus. In both type of apparatus the articles are chilled so that the flashes, stiffened by the low temperature, become brittle and are easily broken off.

In the deflashing apparatus of the first type, the articles to be deflashed are put into a rotatable cylinder-shaped or prismatic container, which is chilled so that the articles contained therein are chilled as well and, by bumping against each other, cause the flashes to break off. The flash is then discharged in known manner out of the container.

In the deflashing apparatus of the second type, the articles to be deflashed are put into a vibrating container and, as a result of the vibrations, the articles interact thus causing the flash to break off. In both type of machines, the cooling system may be different. Said cooling may occur e.g. by introducing solid carbon dioxide or a liquefied gas into the container or also by cooling the container externally with the aid of any means known in the cooling technique.

The known deflashing apparatus show several drawbacks. In the above mentioned apparatus of the first type, the most common drawbacks consist in the breaking or partial splintering of the articles being processed and in the possibility that before breaking off, the flash bends and permanently adheres onto the outer surface of the articles to be deflashed. In the abovementioned apparatus of the second type, one of the drawbacks which are most often remarked consists in that the mechanical action obtained by vibration is insufficient to remove the thicker flashes.

SUMMARY OF THE INVENTION

Accordingly it is the main object of this invention to provide an apparatus substantially free from one or more of the disadvantages of prior deflashing apparatus.

Another object of this invention is to provide a deflashing apparatus which permits high working speed with consequential reduction in costs and labor.

These objects are attained according to this invention with a deflashing apparatus comprising a container for the articles to be deflashed and a cooling system for said articles, inside said container there being placed an agitating device which is adapted to impart a movement to said articles exerting upon them a direct mechanical action with consequent removal of the flash which has become brittle owing to the cooling.

BRIEF DESCRIPTION OF THE DRAWINGS

These and other features of the invention will be evident to those skilled in the art from the following detailed description of an embodiment thereof, with reference to the accompanying drawings, wherein.

DETAILED DESCRIPTION OF THE PREFERRED EMBODIMENT

Figure 1:
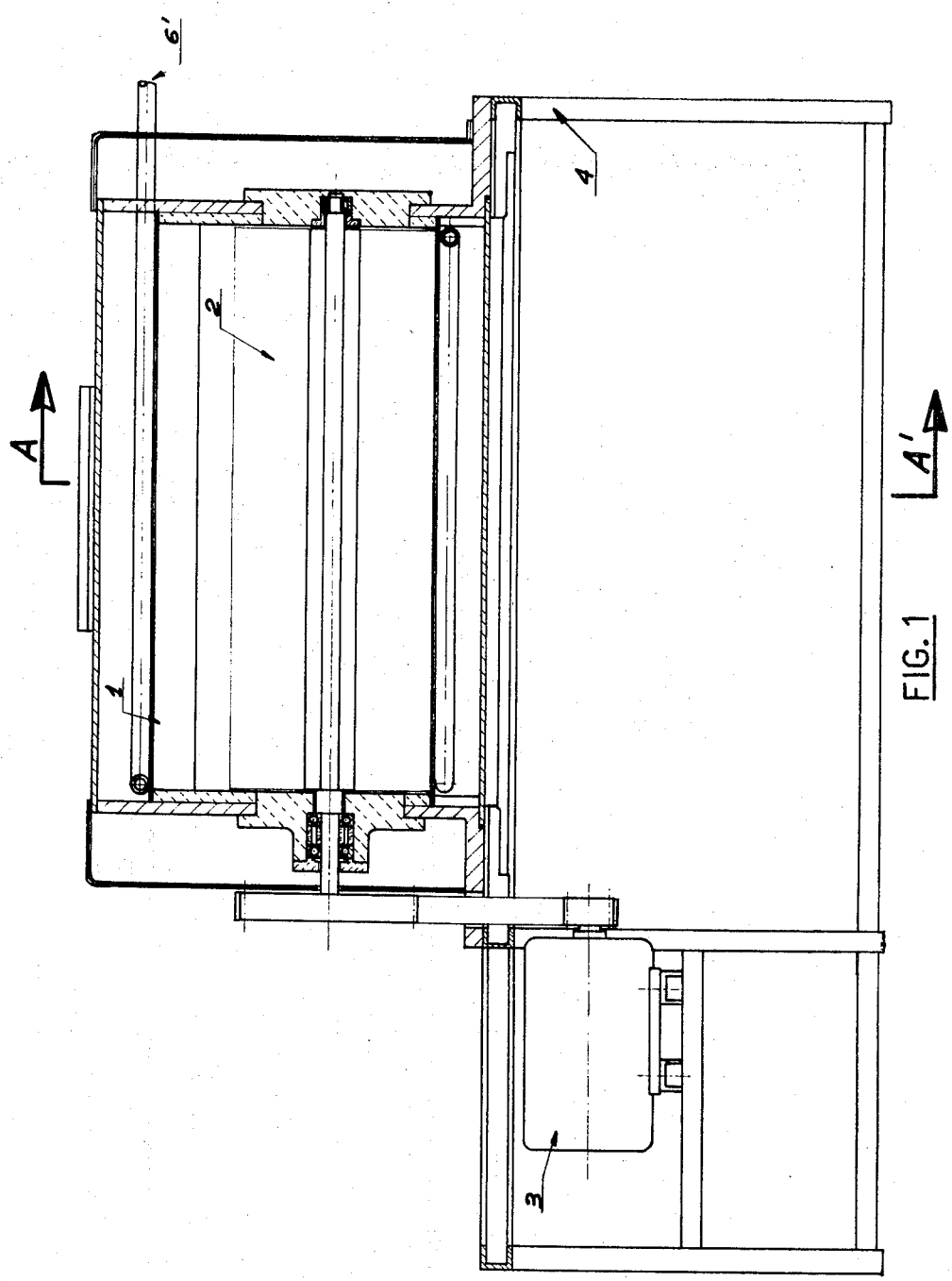
FIG. 1 is a schematic elevational view of a deflashing apparatus according to this invention.

With reference to FIG. 1, it can be seen that the deflashing apparatus according to this invention essentially comprises a fixed container 1 housing an agitating device 2 which in this specific case is represented by a pair of rotating brushes, said device being moved by motor 3. The container 1, which is obviously provided with one or more openings for charging and discharging the articles being processed, presents other means necessary for cooling the container and the articles contained therein. The container 1 is supported by an adequate base 4. Said base may be used also as a support for the flash collecting containers, for the cooling device, etc.

Figure 2:
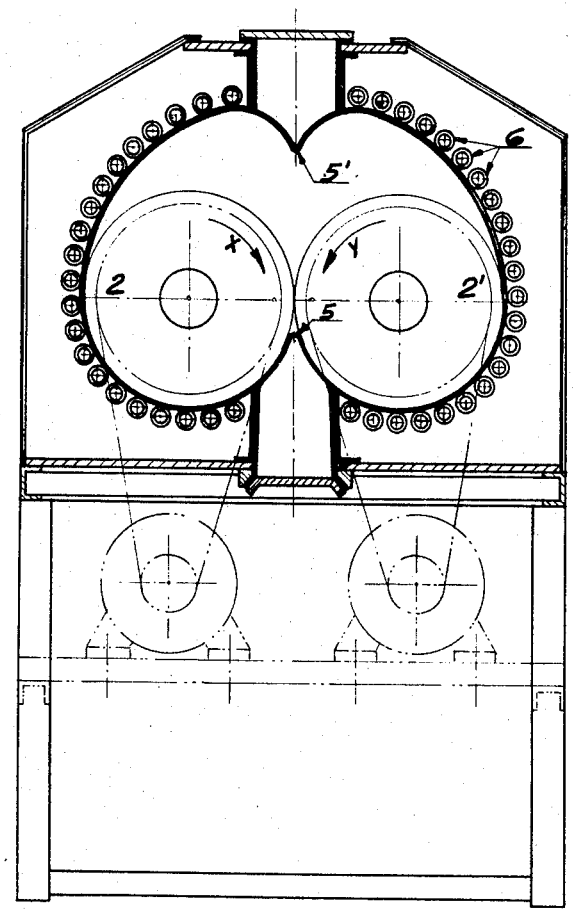
FIG. 2 is a schematic cross-sectional view of the same apparatus taken along the line A—A' of FIG. 1.

With reference to FIG. 2, there can be seen the preferred internal shape of the container 1. The inside of said container, which is designed to contain the articles to be processed and in which the agitating device is housed, has an essentially bi-lobed shape defined by the opposed projections 5 and 5'.

In the preferred embodiment of this invention the agitating device consists of a pair of brushes 2 and 2' rotating preferably in the sense indicated by the arrows X and Y. The movement is imparted to the brushes in a known manner by a suitable motor. As illustrated with phantom lines in FIG. 2, for each brush there is preferably provided a separate motor which thus consents to adjust independently the sense and rotation rate of each brush.

The function of projection 5 is that of increasing the contact surface between the periphery of the pair of brushes and the inside of the container 1. The function of projection 5' is prevailingly that of exerting a hindering action for the articles being processed which, under the effect of brushes 2 and 2', are projected upwards. Said articles, which bump against the surface of projection 5', besides undergoing a mechanical action with the consequent removal of the flashes, are brought downwards again between the bristles of the rotating brushes 2 and 2'.

As can be easily seen from the figures, the rotating brushes 2 and 2', besides having the specific action of moving the articles being processed, exert through their bristles a direct mechanical action onto the surface of the articles so as to provide a complete removal of the chilled flash.

In the embodiment illustrated in the figures, the container 1 is cooled by an expansion cooling system. FIG. 2 shows a schematic view of coil 6 through which the fluid of the cooling system circulates, while 6' in FIG. 1 indicates the inlet of the cooling fluid.

The container 1 may however be cooled by other cooling methods known in the art. It is possible therefore to feed into container 1 a liquefied gas, e.g. nitrogen, or solid carbon dioxide.

The rotating brushes 2 and 2' are provided with bristles having a certain stiffness and are preferably made out of a material which does not become brittle at low temperatures, e.g. an adequate material may be a polyamide monofilament. Also brushes with metal monofilaments may be quite suitable for this purpose.

The bristles may be arranged on the outer surface of the central core of the brushes either in parallel lines or in sinusoidal or helicoidal lines. The helicoidal arrangement is particularly advisable in order to facilitate the transversal movement of the articles during the deflashing operation. The central core of the brushes is either cylinder-shaped or prismatic, but may have any other suitable shape.

As for the feeding of the articles to be deflashed into the container 1, the latter is provided with a specific port (not shown in the figures), located preferably on the upper part of the container 1. The container 1 is provided also with a discharge port arranged preferably on its lower part. A different arrangement of the openings for charging and discharging the articles is always possible provided that the arrangement and, if necessary, the movement of the rotating brushes is modified accordingly.

Additional modifications and/or additions may be included by those skilled in the art without departing from the scope of this invention as defined by the appended claims, the above embodiment of the invention being described and illustrated only by way of non-limiting example.

What I claim is:

1. An apparatus for deflashing molded articles comprising a container for the articles to be deflashed, a system for cooling said container and the articles contained therein, and an agitating device located within said container and comprising two rotating brushes adapted to impart a movement to said articles, said brushes exerting upon the articles a direct mechanical action with consequent removal of the flash which has become brittle owing to the cooling.

2. The apparatus according to claim 1, wherein the inside of the container is bi-lobed and each lobe contains in the lower part one of the two rotating brushes.

3. The apparatus according to claim 1, wherein each brush consists of a central core bearing on its outer part stiff bristles having such a length that their ends enter into contact both with the internal surface of the container and with the ends of the bristles of the other brush.

* * * * *